United States Patent
Voinov

(10) Patent No.: US 6,892,542 B2
(45) Date of Patent: May 17, 2005

(54) GAS COMPRESSION SYSTEM AND METHOD FOR MICROTURBINE APPLICATION

(75) Inventor: Soren Voinov, West Hollywood, CA (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 10/065,046

(22) Filed: Sep. 13, 2002

(65) Prior Publication Data

US 2004/0050065 A1 Mar. 18, 2004

(51) Int. Cl.$^7$ ................................................ F02C 3/22
(52) U.S. Cl. ..................................... 60/772; 60/39.465
(58) Field of Search ........................... 60/39.465, 734, 60/772, 801

(56) References Cited

U.S. PATENT DOCUMENTS

| | | | | |
|---|---|---|---|---|
| 3,107,482 A | * | 10/1963 | Fono | 60/772 |
| 3,161,020 A | * | 12/1964 | La Haye | 60/772 |
| 5,609,016 A | * | 3/1997 | Yamada et al. | 60/39.465 |
| 6,066,898 A | | 5/2000 | Jensen | 290/52 |
| 6,246,138 B1 | | 6/2001 | Nims | 310/90 |
| 6,338,239 B1 | * | 1/2002 | Hirata et al. | 60/39.12 |

FOREIGN PATENT DOCUMENTS

JP          11-153041      * 6/1999

* cited by examiner

*Primary Examiner*—Louis J. Casaregola
(74) *Attorney, Agent, or Firm*—Sutherland Asbill Brennan

(57) ABSTRACT

The present invention may include a microturbine power generating system which may include a combustor for combusting a gaseous fuel to provide a supply of gaseous heat energy, a radial gas compressor for delivering said gaseous fuel to said combustor, and an electric motor to power said radial gas compressor.

19 Claims, 4 Drawing Sheets

GAS COMPRESSION SYSTEM AND METHOD FOR MICROTURBINE APPLICATION

BACKGROUND OF INVENTION

TECHNICAL FIELD

The present invention relates generally to microturbine power generating systems and methods. More specifically, the present invention relates to systems and methods for delivering compressed gaseous fuel to a combustor of a microturbine. The present invention further relates to systems and methods for delivering compressed air to the air-bearing systems of a microturbine.

Microturbines are one type of combustion turbine currently being used for stationary energy generation applications. The use of microturbines may provide new opportunities for power users to reduce energy cost, increase power quality and reliability, and reduce environmental emissions. Furthermore, smaller industrial turbine applications, which inevitably share many microturbine features, may benefit from microturbine technology and advances. These new products and market conditions provide power users with the opportunity to invest in smaller-scale distributed energy resources that may be integrated into overall manufacturing or building operations.

A microturbine power generation unit may operate on liquid or gaseous fuel. Natural gas currently may be a preferred fuel for microturbines due to costs, availability, and combustion and emissions characteristics. For microturbines adapted to use gaseous fuel, such as natural gas, the gas may be compressed to desired levels before being delivered to the combustor so as to increase overall efficiency. The gas pressure of the available natural gas supply in most locations, however, often may be too low to allow for direct firing in microturbines, making gas compression a necessity. Many existing microturbine applications make use of reciprocating compressors. However, there are certain drawbacks associated with such use. For example, reciprocating compressors may introduce unwanted vibration to the system and may be expensive to operate and maintain.

Furthermore, microturbine bearing and lubrication systems, especially as related to the shaft of the turbine, may face significant temperature, pressure, and spin rates. Many existing turbine applications thus employ an air-bearing system to support the turbine shaft. The use of an air-bearing system generally eliminates the need for a separate bearing lubrication system and generally reduces the required maintenance. Such air-bearing systems, however, generally may require a constant supply of compressed air to operate. Many existing turbines will bleed a supply of compressed air from the air compressor of the main turbine to provide this supply. There are, however, certain drawbacks associated with providing the necessary compressed air in this manner. For example, during the start-up process of the microturbine, a sufficient supply of compressed air may not yet be available.

SUMMARY OF INVENTION

The present invention thus may provide a microturbine power generating system. The system may include a combustor for combusting a gaseous fuel to provide a supply of gaseous heat energy, a radial gas compressor for delivering the gaseous fuel to the combustor, and an electric motor to power the radial gas compressor.

In another embodiment, the present invention may provide a method of operating a microturbine power generating system that has a combustor, a turbine, an electrical generator, a radial gas compressor, and an electric motor. The method may include combusting a gaseous fuel to gaseous heat energy in the combustor, converting gaseous heat energy into mechanical energy by the turbine, converting mechanical energy into electrical energy by the electrical generator, and delivering a supply of the gaseous fuel to the combustor by the radial gas compressor powered by the electric motor.

In another embodiment, the present invention may provide a microturbine power generating system which may include a combustor for combusting a gaseous fuel to provide a supply of gaseous heat energy, a turbine for converting the supply of gaseous heat energy into mechanical energy, an electrical generator driven by the turbine for converting mechanical energy produced by the turbine into electrical energy, and a radial gas compressor for delivering the gaseous fuel to the combustor. A microturbine shaft may connect the turbine and the electrical generator. A compressor shaft may connect the radial gas compressor, an electric motor, and an air-bearing compressor. The electric motor may power the radial gas compressor and the air-bearing compressor. One or more air-bearings may support the microturbine shaft, and one or more compressor air-bearings may support the compressor shaft. The air-bearing compressor may deliver a supply of compressed air to the one or more air-bearings and the one or more compressor air-bearings.

In another embodiment, the present invention may provide a microturbine power generating system which may include a combustor for combusting a gaseous fuel to provide a supply of gaseous heat energy, a turbine for converting the supply of gaseous heat energy into mechanical energy, an electrical generator driven by the turbine for converting mechanical energy produced by the turbine into electrical energy, and a radial gas compressor for delivering the gaseous fuel to the combustor. An electric motor may power the radial gas compressor during microturbine start-up. A compressor power turbine may power the radial gas compressor once microturbine startup is complete. A portion of the supply of gaseous heat energy delivered to the turbine may be diverted to the compressor power turbine, wherein the compressor power turbine may convert the supply of gaseous heat energy into mechanical energy.

In another embodiment, the present invention may provide a microturbine power generating system which may include a combustor for combusting a gaseous fuel to provide a supply of gaseous heat energy, a turbine for converting the supply of gaseous heat energy into mechanical energy, an electrical generator driven by the turbine for converting mechanical energy produced by the turbine into electrical energy, and a radial gas compressor for delivering the gaseous fuel to the combustor. A microturbine shaft may connect the turbine and the electrical generator. A compressor shaft may connect the radial gas compressor, an electric motor, and an air-bearing compressor. One or more air-bearings may support the microturbine shaft. One or more compressor air-bearings may support the compressor shaft. The air-bearing compressor may deliver a supply of compressed air to the one or more air-bearings and the one or more compressor air-bearings. The electric motor may power the radial gas compressor and the air-bearing compressor during microturbine start-up, and the compressor power turbine may power the radial gas compressor and the air-bearing compressor once microturbine startup is complete. A portion of the supply of gaseous heat energy delivered to the turbine may be diverted to the compressor power turbine, wherein the compressor power turbine may convert the supply of gaseous heat energy into mechanical energy.

These and other features of the present invention will become apparent upon review of the following detailed description of the present embodiments of the invention, when taken in conjunction with the drawings and the appended claims.

DETAILED DESCRIPTION

Figure 1:
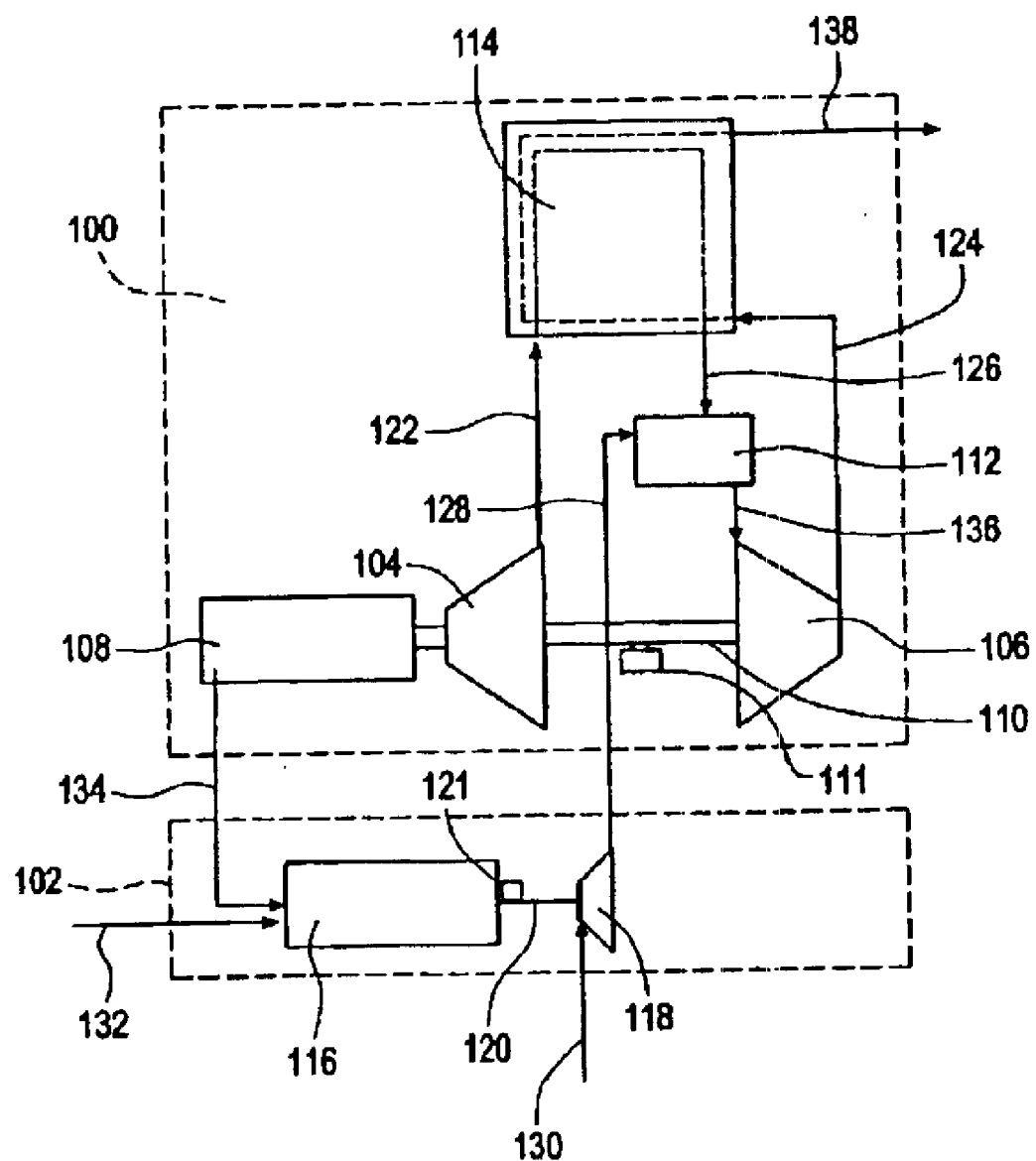
FIG. 1 is a schematic diagram of an embodiment of the invention.

Referring now to the figures, where the various numbers represent like parts throughout the several views, FIG. 1 shows an embodiment of the present invention, a power generating system. The power generating system may include a microturbine 100 and an attached-compressor 102. The microturbine 100 may include an air compressor 104, a power turbine 106, and an electrical generator 108. The electrical generator 108 may be a ring-wound, two-pole toothless (TPTL) brushless permanent magnet machine having permanent magnet rotor and stator windings or other similar generators known in the art. When the rotor is rotated by turbine power, an electrical current may be induced in the stator windings. Other types of electrical generators 108 also may be used.

The air compressor 104, the power turbine 106, and the electrical generator 108 may be powered by a microturbine shaft 110. The microturbine shaft 110 may be a single common shaft or multiple separate shafts. Although the air compressor 104, the power turbine 106, and the electrical generator 108 may be mounted to separate shafts, the use of the single common microturbine shaft 110 may add to the compactness and reliability of the microturbine 100 as a whole.

The microturbine shaft 110 may be supported by one or more air-bearings 111. As used herein, said air-bearings 111 may be a type of a gas bearing. For example, gas bearings in which the operating medium is air obtained from the environment. An example of said air-bearings 111 is shown in U.S. Pat. No. 6,246,138, incorporated herein by reference. Commercial examples include "Parallon 75" by General Electric Corporation of Schenectady, N.Y., or other similar types of turbomachinery or other similar types of air-bearing systems. The air-bearings 111 may eliminate the need for a separate bearing lubrication system and may reduce the amount of required maintenance.

The microturbine 100 also may include a combustor 112 and a recuperator 114. The combustor 112 may be connected to the attached-compressor 102. The attached-compressor 102 may include an electric motor 116. The electric motor 116, for example, may be a high-speed electric motor similar to the permanent magnet motors sold by Turbodyne Technologies of Carpinteria, Calif., or Calnetix of Torrance, Calif., or a switch reluctance motor or an induction motor. Other similar types of electric motors also may be used. The attached-compressor may include a gas compressor 118, which may be any of a type of suitable radial compressors known in the art. For example, the gas compressor 118 may be a Centrifugal supercharger sold by Turbodyne Technologies of Carpinteria, Calif., or other similar radial gas compressors also may be used. The use of a radial gas compressor for this application may eliminate the vibration associated with reciprocating compressors. The gas compressor 118 may be connected to the electric motor 116 by a compressor shaft 120. The compressor shaft 120 may be supported by one or more compressor air-bearings 121. The compressor air-bearings 121 may be similar to the system 111 described above. Said compressor air-bearings 121 may eliminate the need for a separate bearing lubrication system and reduce the occurrence of maintenance servicing.

A microturbine 100 useful with the present invention may be a microturbine sold under the mark "Parallon 75®" by General Electric Corporation of Schenectady, N.Y. The "Parallon 75®" microturbine 100 may generate about 75 kilowatts (75 kW) of electricity. Other microturbines 100 useful with the present invention include Elliott 35, 60 and 80 kW, sold by Elliott Energy Systems, Inc. of Jeannette, Pa.; Capstone C30 and C60, sold by Capstone Turbine, Inc. of Woodland Hills, Calif.; and similar types of devices.

In use, the microturbine 100 may operate as follows. Air entering the air compressor 104 may be compressed. A supply of compressed air 122 may be directed to the recuperator 114. The recuperator 114 may transfer heat from a supply of exhaust gas 124 to the supply of compressed air 122. Preheating combustion air in this manner may reduce the fuel consumption of the microturbine 100 and may increase its overall efficiency. The compressed air may be circulated through the cold-side passages of the recuperator 114 and may absorb heat from the exhaust gas. A supply of heated compressed air 126 may then be directed to the combustor 112. The temperature of the compressed air supply 126 may be about 580 to 600° Celsius (1050 to 1100° Fahrenheit).

A supply of compressed gaseous fuel 128 also may be supplied to the combustor 112 from the attached-compressor 102. In the attached-compressor 102, the electric motor 116 may power the gas compressor 118 receiving a supply of gas 130. The choice of supply of gas 130 may include any suitable gaseous fuel. For example, natural gas, naphtha, propane, JP-8, methane, and other gases may be used. The electric motor 116 may spool the rotor of the gas compressor 118 to a designed speed to provide appropriate gas flow at start up. Thusly, the supply of gas 130 may be compressed, and a supply of compressed gas 128 may be supplied to the combustor 112. The supply of gas 130 may be pressurized to about 4.2 to 5.6 kilograms/centimeter$^2$(60–80 PSIA).

During microturbine 100 startup, the electric motor 116 may receive a start-up power supply 132 from the power grid. During steady-state operation of the microturbine, the electric motor 116 may switch to a steady-state power supply 134 from the electrical generator 108.

The supply of compressed gas 128 may be injected into the combustor 112 and may be mixed with the supply of supply of heated compressed air 126 within the combustor 112. Within the combustor 112, the resulting mixture may be ignited by an igniter in an exothermic reaction. A supply of gaseous heat energy 136 resulting from combustion in the combustor 112 may then be directed to the power turbine 106. The gaseous heat energy resulting from the combustion may be expanded through the power turbine 106, thereby creating turbine power. The turbine power may, in turn, drive the air compressor 104 and the electrical generator 108 so as to produce electrical power.

The supply of turbine exhaust gas 124 may be directed to the recuperator 114. Within the recuperator 114, the exhaust gas may be circulated by hot side passages, and heat from the turbine exhaust gas on the hot side may be transferred to the compressed air on the cold side. In this manner, some heat of combustion may be recuperated and used to raise the temperature of the compressed air en route to the combustor 112. After surrendering part of its heat, the exhaust gas may exit the recuperator 114 and be vented 138. Additional heat recovery stages may be included to further increase the efficiency of the microturbine 100.

Figure 2:
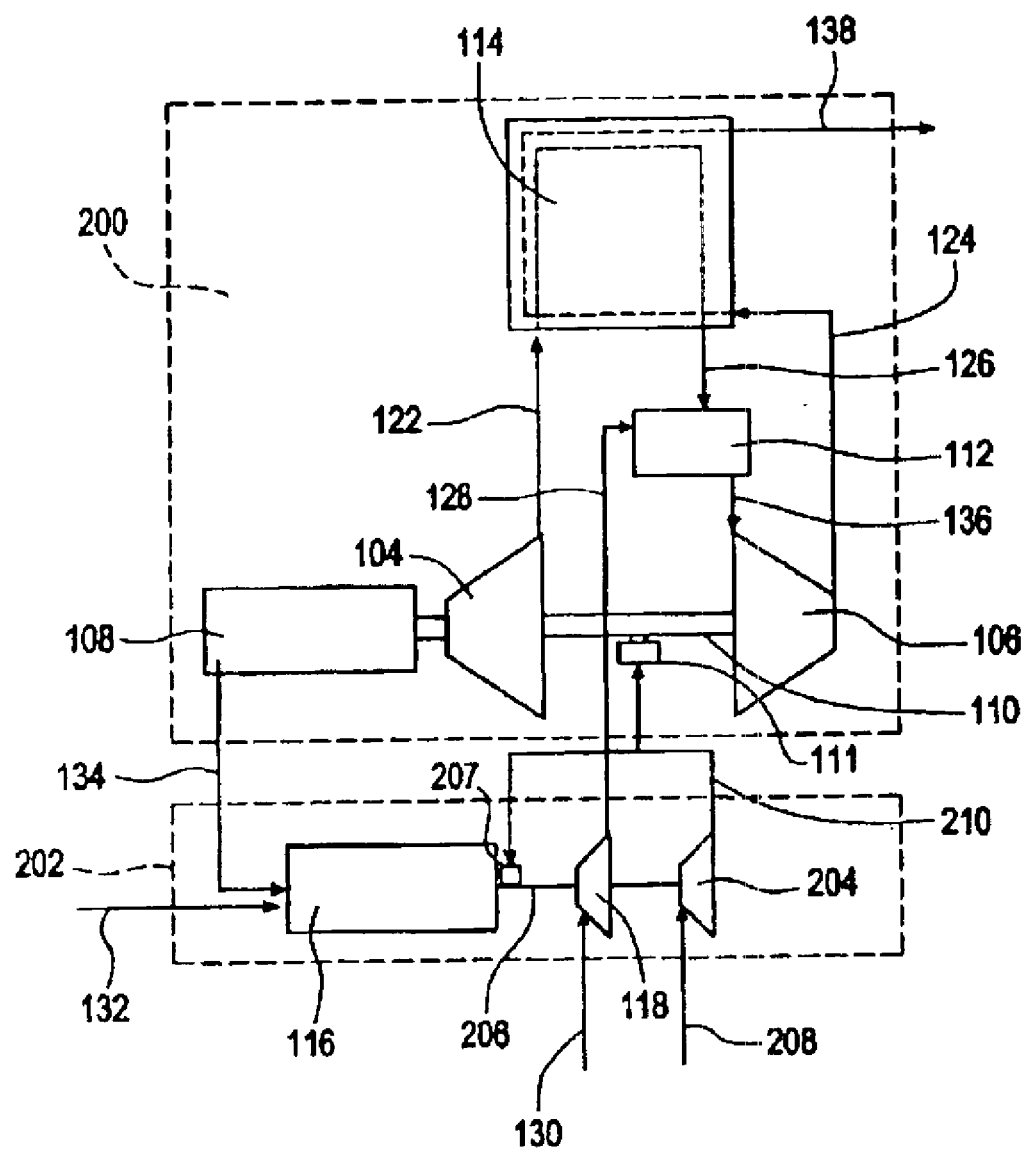
FIG. 2 is a schematic diagram of alternative embodiment of the invention.

FIG. 2 shows an alternative embodiment of the power generating system of the present invention. The power generating system may include a microturbine 200 and an attached-compressor 202. Similar to the microturbine 100, the microturbine 200 may include the air compressor 104, the power turbine 106, the electrical generator 108, the microturbine shaft 110, said air-bearings 111, the combustor 112, and the recuperator 114. In use, the microturbine 200 may operate in generally the same manner as that described for microturbine 100.

The attached-compressor 202 may include the electric motor 116, the start-up power supply 132, the steady-state power supply 134, and the gas compressor 118 as described for the attached-compressor 102. The attached-compressor 202 further may include an air-bearing compressor 204, which may be any of a type of suitable radial compressors known in the art. For example, the air-bearing compressor 204 may be a Turbodyne supercharger sold by Turbodyne Technologies of Carpinteria, Calif., or other similar radial air compressors may also be used. A compressor shaft 206 attached to the electric motor 116 may power the air-bearing compressor 204. The compressor shaft 206 may be a single common shaft that also powers the gas compressor 118 or may be multiple separate shafts. Although the air-bearing compressor 204 and the gas compressor 118 may be mounted to separate shafts, the use of the common compressor shaft 206 may add to the compactness and reliability of the attached-compressor 202. Air may be provided to the air-bearing compressor 204 through an air intake 208. One or more compressor air-bearings 207 may support the compressor shaft 206.

In use, the electric motor 116 may spool the air-bearing compressor 204 to a designed speed to provide the appropriate supply of compressed air 210 to said air-bearings 111 of the microturbine shaft 110 or said compressor air-bearings 207 of the compressor shaft 206 or both. The electric motor 100 may be powered by the start-up power supply 132 such that compressed air may be supplied to the air-bearings 111, 207 of the microturbine shaft 110 or the compressor shaft 206 or both during start-up of the microturbine 200.

Figure 3:
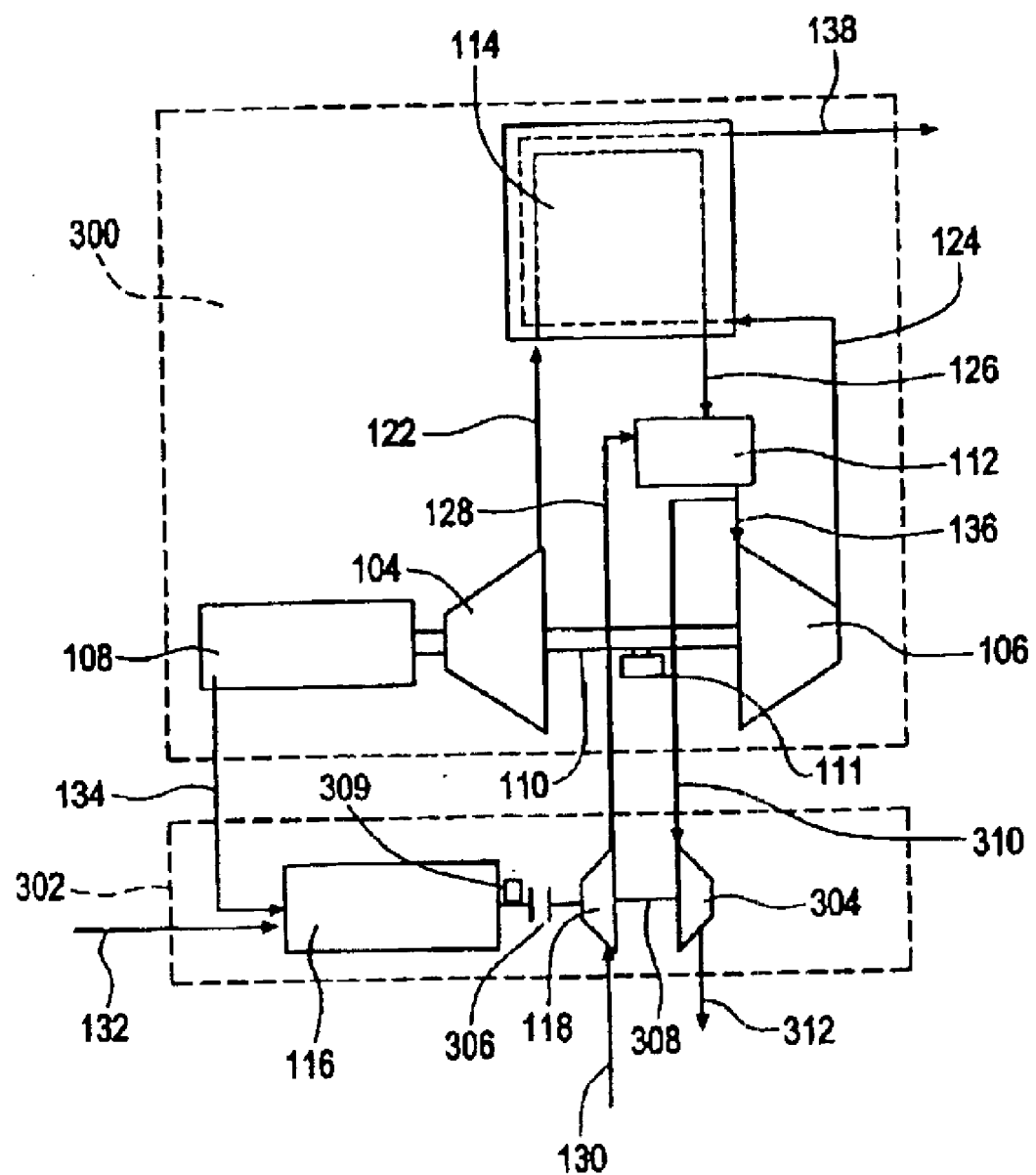
FIG. 3 is a schematic diagram of alternative embodiment of the invention.

FIG. 3 shows an alternative embodiment of the power generating system of the present invention. The power generating system may include a microturbine 300 and an attached-compressor 302. Similar to the microturbine 100, the microturbine 300 may include the air compressor 104, the power turbine 106, the electrical generator 108, the microturbine shaft 110, the air-bearings system 111, the combustor 112, and the recuperator 114. In use, the microturbine 300 may operate in generally the same manner as that described for microturbine 100.

The attached-compressor 302 may include the electric motor 116, the start-up power supply 132, the steady-state power supply 134, and the gas compressor 118 as described for the attached-compressor 102. The attached-compressor 302 further may include a compressor power turbine 304 and an electromagnetic clutch 306. The compressor power turbine 304 and the gas compressor 118 may be connected to the electric motor by a compressor shaft 308. The compressor shaft 308 may be a single common shaft or may be multiple separate shafts. The electromagnetic clutch 306 may interrupt the compressor shaft(s) 308 at a point that separates the electric motor 116 from the compressor power turbine 304 and the gas compressor 118. The compressor shaft 308 may be supported by a compressor air-bearings system 309.

In use, the electric motor 116 may receive power from the start-up power supply 132 from the grid during the microturbine 300 start-up. The electric motor 116 may spool the gas compressor 118 to a designed speed to provide the appropriate gas flow to the microturbine 300 during start-up. During the start-up period, the electromagnetic clutch 306 may remain engaged such that the electric motor 116 is allowed to spool the gas compressor 118.

Once the start-up of the microturbine 300 is complete, the electromagnetic clutch 306 may disengage such that the gas compressor 118 may be powered by the compressor power turbine 304. This may be accomplished by diverting a portion 310 of the supply of the gaseous heat energy 136 to power turbine 106 to direct a second supply of gaseous heat energy 310 to the compressor power turbine 304. The second supply of gaseous heat 310 energy resulting from the combustion in the combustor 112 may then be expanded through the compressor power turbine 304, thereby creating turbine power. The turbine power may, in turn, drive the gas compressor 118, which supplies the combustor 112 with compressed gas fuel. Exhaust gases from the compressor power turbine may exit through a vent 312, although heat recovery stages may be included to increase the efficiency of the compressor power turbine 304.

Figure 4:
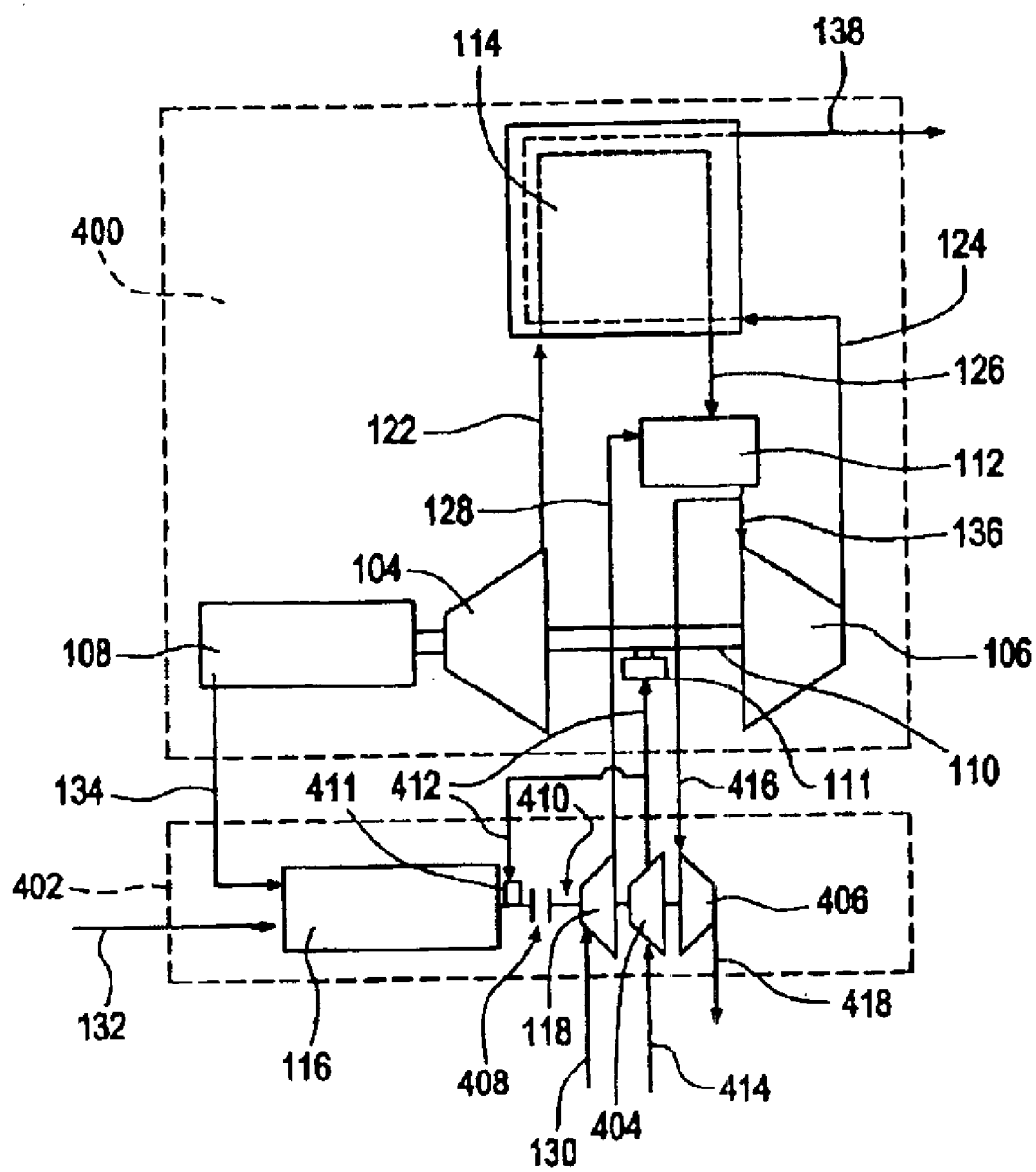
FIG. 4 is a schematic diagram of alternative embodiment of the invention.

FIG. 4 shows an alternative embodiment of the power generating system of the present invention. The power generating system may include a microturbine 400 and an attached-compressor 402. Similar to the microturbine 100, the microturbine 400 may include the air compressor 104, the power turbine 106, the electrical generator 108, the microturbine shaft 110, the air-bearings system 111, the combustor 112, and the recuperator 114. In use, the microturbine 400 may operate in generally the same manner as that described for microturbine 100.

The attached-compressor 402 may include the electric motor 116, the start-up power supply 132, the steady-state power supply 134, and the gas compressor 118 as described for the attached-compressor 102. The attached-compressor 402 further may include an air-bearing compressor 404, a compressor power turbine 406, and an electromagnetic clutch 408. The air-bearing compressor 404 may be any of a type of suitable radial compressors known in the art. For example, the air-bearing compressor 118 may be a Turbodyne Supercharger sold by Turbodyne Technologies of Carpinteria, Calif., or other similar radial air compressors also may be used. The air-bearing compressor 404, the compressor power turbine 406, and the radial gas compressor 118 may be connected to the electric motor by a compressor shaft 410. The compressor shaft 410 may be a single common shaft or may be multiple separate shafts. The compressor shaft 410 may be supported by one or more compressor air-bearings 411. The electromagnetic clutch 408 may interrupt the compressor shaft(s) 410 at a point that separates the electric motor 116 from the air-bearing compressor 404, the compressor power turbine 406, and the gas compressor 118.

In use, the electric motor 116 may receive power from the start-up power supply 132 from the grid during the microturbine 400 start-up. The electric motor 116 may spool the gas compressor 118 to a designed speed to provide the appropriate gas flow to the microturbine 400 during start-up. The electric motor 116 may further spool the air-bearing compressor 404 to a designed speed to provide an appropriate supply of compressed air 412 to the air-bearings 111 of the microturbine shaft 110 or the compressor air-bearings 411 of the compressor shaft 410 or both. Air may be provided to the air-bearing compressor 404 through an air intake 414. During the start-up period, the electromagnetic clutch 408 may remain engaged such that the electric motor 116 is allowed to spool the gas compressor 118 and the air-bearing compressor 404.

Once the start-up of the microturbine 400 is complete, the electromagnetic clutch 408 may disengage such that the gas compressor 118 and the air-bearing compressor 404 may be powered by the compressor power turbine 406. This may be accomplished by diverting a portion 416 of the supply of the gaseous heat energy 136 to the power turbine 106 to direct a second supply of gaseous heat energy 416 to the compressor power turbine 406. The second supply of gaseous heat energy 416 resulting from the combustion in the combustor 112 may then be expanded through the compressor power turbine 406, thereby creating turbine power. The turbine power may, in turn, drive the gas compressor 118, which may supply the combustor 112 with compressed gas fuel. The turbine power may also drive the air-bearing compressor 404, which may supply pressurized air to the air-bearings 111, 411 of the of the microturbine shaft 110 or the compressor shaft 410 or both. Exhaust gases from the compressor power turbine may exit through a vent 418, although heat recovery stages may be included to increase the efficiency of the compressor power turbine 406.

Therefore, the foregoing is considered as illustrative only of the principles of the invention. The features and aspects of the present invention have been described or depicted by way of example only and are therefore not intended to be interpreted as required or essential elements of the invention. It should be understood that the foregoing relates only to certain exemplary embodiments of the invention, and that numerous changes and additions may be made thereto without departing from the spirit and scope of the invention as defined by any appended claims.

What is claimed is:

1. A microturbine power generating system, comprising:
   a combustor for combusting a gaseous fuel to provide a supply of gaseous heat energy;
   a radial gas compressor for delivering said gaseous fuel to said combustor;
   an electric motor; and
   a compressor power turbine;
   wherein said electric motor powers said radial gas compressor during microturbine start-up; and
   wherein said compressor power turbine powers said radial gas compressor after microturbine start-up is complete.

2. The system of claim 1, further comprising a turbine for converting the supply of gaseous heat energy into mechanical energy and an electrical generator driven by said turbine for converting mechanical energy produced by the turbine into electrical energy.

3. The system of claim 2, further comprising a microturbine shaft connecting said turbine and said electrical generator;
   further comprising one or more air-bearings to support said microturbine shaft; and further comprising an air-bearing compressor to deliver a supply of compressed air to said one or more air-bearings.

4. The system of claim 3, further comprising a compressor shaft connecting said radial gas compressor, said air-bearing compressor, and said electric motor;
   further comprising one or more compressor air-bearings to support said compressor shaft; and
   wherein said air-bearing compressor delivers a second supply of compressed air to said one or more compressor air-bearings.

5. The system of claim 2, further comprising an electromagnetic clutch such that said electromagnetic clutch disengages said electric motor and engages said compressor power turbine once microturbine start-up is complete.

6. The system of claim 2, wherein a portion of the supply of gaseous heat energy delivered to said turbine is diverted to said compressor power turbine; and
   wherein said compressor power turbine converts said portion of the supply of gaseous heat energy into mechanical energy.

7. The system of claim 3, further comprising a compressor shaft connecting said radial gas compressor, said air-bearing compressor, said compressor power turbine, and said electric motor;
   further comprising one or more compressor air-bearings to support said compressor shaft; and
   wherein said air-baring compressor delivers a second supply of compressed air to said one or more compressor air-bearings.

8. The system of claim 7, wherein said electric motor powers said air-bearing compressor during microturbine startup; and
   wherein said compressor power turbine powers said air-bearing compressor after microturbine start-up is complete.

9. The system of claim 8, further comprising an electromagnetic clutch such that said electromagnetic clutch disengages said electric motor and engages said compressor power turbine once microturbine start-up is complete.

10. The system of claim 8, wherein a portion of the supply of gaseous heat energy delivered to said turbine is diverted to said compressor power turbine; and
    wherein said compressor power turbine converts said portion of the supply of gaseous heat energy into mechanical energy.

11. A method of operating a microturbine power generating system that has a combustor, a turbine, an electrical generator, a radial gas compressor, an electric motor, and a compressor power turbine, comprising:
    combusting a gaseous fuel to gaseous heat energy in said combustor;
    converting gaseous heat energy into mechanical energy by said turbine;
    converting mechanical energy into electrical energy by said electrical generator;
    delivering a supply of said gaseous fuel to said combustor by said radial gas compressor; and
    powering said radial gas compressor during microturbine start-up by said electric motor; and
    powering said radial gas compressor after microturbine start-up is complete by said compressor power turbine.

12. The method of claim 11, wherein said turbine and said electrical generator are connected by a microturbine shaft;

and wherein said microturbine shaft is supported by one or more air-bearings, further comprising delivering a supply of compressed air to said one or more air-bearings of said microturbine shaft by an air-bearing compressor.

13. The method of claim 12, wherein said radial gas compressor, said air-bearing compressor, and said electric motor are connected by a compressor shaft; and wherein said compressor shaft is supported by one or more compressor air-bearings, further comprising delivering a second supply of compressed air to said one or more compressor air-bearings by said air-bearing compressor.

14. The method of claim 11, further comprising disengaging said electric motor and engaging said compressor power turbine once microturbine start-up is completed by an electromagnetic clutch.

15. The method of claim 11, further comprising:
diverting a portion of the supply of gaseous heat energy delivered to said turbine; and
using said portion of the supply of gaseous heat energy in said compressor power turbine to produce mechanical energy.

16. The method of claim 12, wherein said radial gas compressor, said air-bearing compressor, said compressor power turbine, and said electric motor are connected by a compressor shaft; and wherein said compressor shaft is supported by one or more compressor air-bearings, further comprising delivering a second supply of compressed air to said one or more compressor air-bearings by said air-bearing compressor.

17. The method of claim 16, further comprising:
powering said air-bearing compressor during microturbine start-up by said electric motor; and
powering said air-bearing compressor after microturbine start-up is complete by said compressor power turbine.

18. The method of claim 17, further comprising disengaging said electric motor and engaging said compressor power turbine once microturbine start-up is completed by an electromagnetic clutch.

19. The method of claim 17, further comprising:
diverting a portion of the supply of gaseous heat energy delivered to said turbine; and
using said portion of the supply of gaseous heat energy in said compressor power turbine to produce mechanical energy.

* * * * *